(12) United States Patent
Griffin

(10) Patent No.: US 6,870,968 B2
(45) Date of Patent: Mar. 22, 2005

(54) OPTICAL SIGNAL TIME-SCALING ARRANGEMENT

(75) Inventor: Robert Anthony Griffin, Northants (GB)

(73) Assignee: Bookham Technology PLC, Oxfordshire (GB)

( * ) Notice: Subject to any disclaimer, the term of this patent is extended or adjusted under 35 U.S.C. 154(b) by 228 days.

(21) Appl. No.: 10/221,575

(22) PCT Filed: Mar. 14, 2001

(86) PCT No.: PCT/GB01/01118
§ 371 (c)(1),
(2), (4) Date: Sep. 13, 2002

(87) PCT Pub. No.: WO01/69820
PCT Pub. Date: Sep. 20, 2001

(65) Prior Publication Data
US 2003/0025975 A1 Feb. 6, 2003

(30) Foreign Application Priority Data
Mar. 15, 2000 (GB) .............................. 0006093

(51) Int. Cl.$^7$ ........................... G02B 6/293; G02B 6/00
(52) U.S. Cl. .............................. 385/2; 385/24; 398/81; 398/82
(58) Field of Search .................... 385/1–3, 24; 398/81, 398/82

(56) References Cited

U.S. PATENT DOCUMENTS

| | | | |
|---|---|---|---|
| 4,928,316 A | 5/1990 | Heritage et al. | ............. 455/600 |
| 2004/0062469 A1 * | 4/2004 | Ionov | .......................... 385/15 |

OTHER PUBLICATIONS

J.L. Corral et al. "Optical Beamforming Network Based On Chirped Fiber Gratings Continuously Variable True-Time-Delay Lines" IEEE MTT-S International Microwave Symposium Digest, U.S. NY, NY, Jun. 7, 1998 pp. 1379–1382.

J. Park et al. "Elimination of the fibre chromatic dispersion penalty on 1550nm millimetre-wave optical transmission" Electronics Letters, IEE Stevenage, GB, vol. 33, No. 6, Mar. 13, 1997, pp. 512–513.

K. Yonenaga et al. "A Fiber Chromatic Dispersion Compensation Technique with an Optical SSB Transmission in Optical Homodyne Detection Systems" IEEE Photonics Technology Letters, US, IEEE Inc. NY, vol. 5, No. 8, Aug. 1, 1993 pp. 949–951.

* cited by examiner

*Primary Examiner*—Akm Enayet Ullah
*Assistant Examiner*—Kevin S. Wood
(74) *Attorney, Agent, or Firm*—Fleshner & Kim, LLP

(57) ABSTRACT

A signal time-scaling arrangement utilises a known configuration comprising the use of a laser which has its wavelength varied over time, a modulator coupled to the laser and to a modulating analogue electrical source and a dispersion means coupled to the output of the modulator and providing at its output a signal which is a stretched version of the analogue modulating signal, but provides for the modulator to be a single-sideband modulator instead of double-sideband. The effect of this is to enable the use of a much simple laser-control system involving a CW laser output which is wavelength-ramped continuously between quite narrow wavelength limits, while allowing the use of a dispersion means having a wide dispersion characteristic in order to provide the required degree of time-scaling. The invention is application to an ADC system or to a Doppler system.

22 Claims, 3 Drawing Sheets

OPTICAL SIGNAL TIME-SCALING ARRANGEMENT

This application claims priority to PCT/GB01/01118, filed Mar. 14, 2001, published on Sep. 20, 2001, Publication No. WO 01/69820 A1 in the English language and which claimed priority to GB Patent Application No. 0006093.9, filed Mar. 15, 2000.

The invention relates to a signal time-scaling arrangement, and in particular, but not exclusively, a signal time-scaling arrangement as employed in the processing of very high speed electrical signals, and more particularly as employed in the conversion of analogue signals of this nature to digital form.

Conventionally, analogue electrical signals are converted into digital form using one of the known electrical analogue-to-digital conversion (ADC) techniques, which include, purely as examples, dual-ramp, charge-balancing, successive-approximation and flash-conversion arrangements. In all these methods there is a limit to the rate at which digital values can be formed from the input analogue signal. In the slower methods (virtually all except the flash converter) time must be allowed for the required integration or approximation processes to take place, this time being provided by a suitable sample-and-hold arrangement which freezes the input while it is being operated on. In the case of flash conversion, which is normally the fastest variety, although there is no sample-and-hold operation, there are still the unavoidable propagation delays associated with the various stages of the converter. These speed limits from whatever cause determine the maximum sampling-rate capability of the ADC.

There is, however, a need for an ADC system which can provide an adequate number of digitised samples of an analogue signal lasting for only a short period, e.g. of the order of nanoseconds. This has been found to be extremely difficult to achieve using an electrical ADC by itself and supplementary measures have been taken in the past in an attempt to approach the required performance. One such measure is based on the use of a time-stretching technique and involves the use of a laser, a modulator, a dispersion-producing means and a conventional electronic ADC. This system is illustrated in FIG. 1, in which an optical source (in practice a laser) 10 is arranged to produce radiation of different wavelengths over time between a low and a high wavelength-value limit, the thus modulated optical radiation constituting a carrier which is then intensity-modulated in a modulator 12 by an electrical analogue signal 14, the digital equivalent of which is desired to be obtained. The resultant modulated carrier is passed through a dispersion means 16 after which it is converted from optical to electrical form in a suitable converter 18 and digitised in an electronic ADC 20. The digital representation of the signal 14 is then processed as required.

Conventionally, the modulator 12 is a readily available modulator of, for example, the Mach-Zehnder type. It has been found in practice that the laser 10 used for this process has to be of considerable complexity in order to accommodate the large wavelength variations necessary to be able to resolve the very fast signals 14 on the modulator input. Complexity of design naturally incurs the drawback of increased expense.

In accordance with the invention there is provided a signal time-scaling arrangement comprising: an optical source for delivering radiation at a wavelength which is variable with time over a given wavelength range; a single-sideband modulating means having a first input coupled to the optical source, a second input coupled to a modulating source, and an output; and a signal-dispersion means coupled to the output of the modulating means, the signal-dispersion means being operative to impose different delays on different wavelength components of the radiation, an output of the signal-dispersion means forming the output of the signal time-scaling arrangement.

In a second aspect of the invention, a method for time-scaling a signal comprises: providing a source of optical radiation of a wavelength which is varied with time over a given wavelength range; intensity-modulating said radiation with an analogue signal which is to be time-scaled, the intensity-modulation taking place in a single-sideband modulator, and subjecting the modulated radiation to a dispersion process whereby different wavelength components of the radiation are delayed by different amounts, the thereby dispersion-processed modulated radiation constituting the time-scaled signal.

The optical source is preferably a continuous-wave optical source and the variation of the radiation wavelength is preferably a continuous variation over a given time period, more particularly a substantially linear ramp.

The modulating means may be fed with the modulating signal and a Hilbert-transformed version of the modulating signal, the modulating means may be a double-sideband modulator having a modulating input fed with the modulating signal and an output connected to the signal-dispersion means through a phase modulator, a modulating input of the phase modulator being fed with the Hilbert-transformed modulating signal. Alternatively, the modulating means may be a Mach-Zehnder modulator whose electrodes, which are associated with the two limbs of the modulator's "Y" waveguide arrangement, are fed respectively by the modulating signal and the Hilbert-transformed version of the modulating signal.

The signal-dispersion means may comprise an optical fibre having intrinsic dispersion properties. The signal-dispersion means may comprise a fibre Bragg-grating device. The optical source is, most conveniently, a laser.

A third aspect of the invention provides for an an analogue-to-digital conversion arrangement comprising a signal time-scaling arrangement as described above, in which the output of the signal-dispersion means is coupled to an opto-electrical converter for converting the optical signal at the output of the signal-dispersion means into an electrical signal, and an output of the opto-electrical converter is coupled to an electrical analogue-to-digital conversion means.

The opto-electrical converter is preferably a photodiode, though an avalanche photodiode or a photo-transistor are possible alternatives.

According to a fourth aspect of the invention, a frequency-shifter arrangement comprises a signal time-scaling arrangement as described above, in which spectral components of the modulating signal appear shifted in frequency at the output of the dispersion means. The frequency-shifter arrangement finds possible use as a Doppler generator arrangement, in which the modulating source is a source of continuous sinewaves. The sinewaves may be of a predetermined frequency or within a predetermined range of frequencies.

The signal time-scaling action may be either a time-stretching one or a time-compressing one. For time-stretching the laser wavelength may be varied in a direction of increasing frequency and the dispersion means may subject the higher-frequency components of the radiation to a longer delay than the lower-frequency components of the radiation. Alternatively, the wavelength is varied in the opposite direction and it is the lower-frequency components of the radiation that are subjected to the longer delay.

In the time-compression case, the laser wavelength may be varied in a direction of decreasing frequency and the dispersion means may subject the higher-frequency components of the radiation to a longer delay than the lower-frequency components of the radiation. Alternatively, the wavelength is varied in the opposite direction and it is the lower-frequency components of the radiation that are subjected to the longer delay.

An embodiment of a signal time-scaling arrangement in accordance with the invention will now be described by way of example only with the aid of the drawings, of which:

Figure 4A:
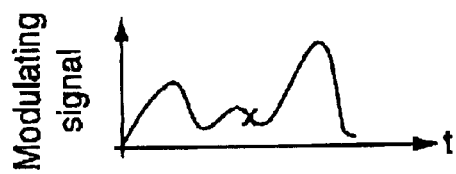
Figure 5:
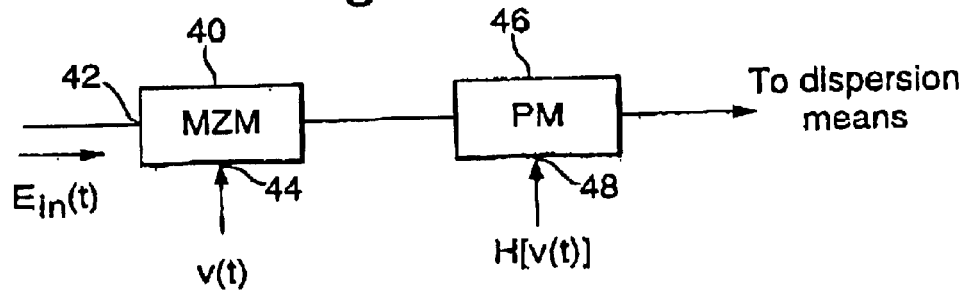
Figure 6:
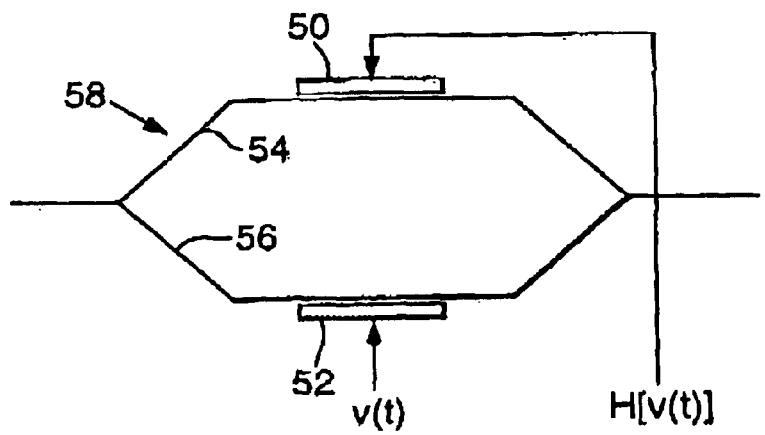
Figure 7:
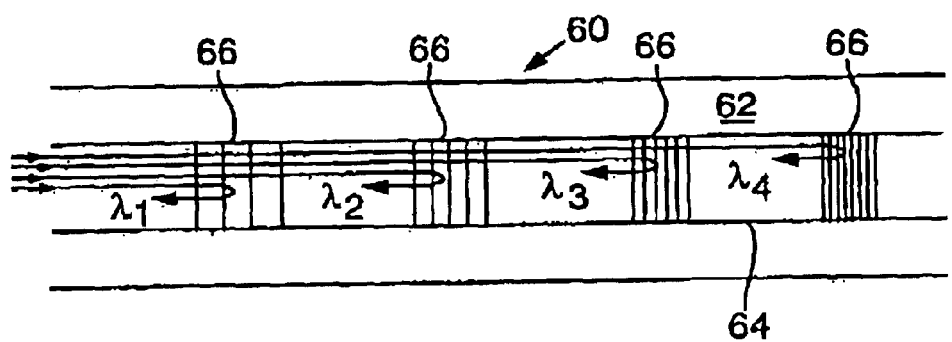
Figure 8:
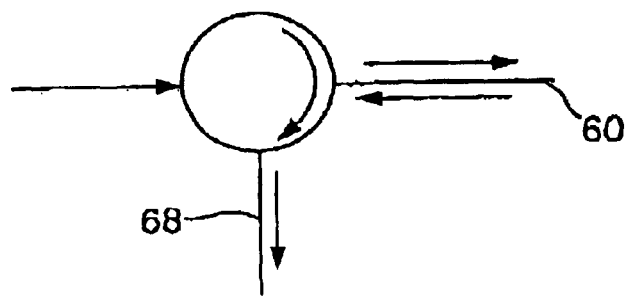

FIGS. 4(a), (b) and (c) are waveform/timing diagrams illustrating the benefits of the application of a time-scaling arrangement to an ADC system;

FIG. 5 is a schematic diagram of a first realisation of a modulator suitable for use in a time-scaling arrangement according to the invention;

FIG. 6 is a schematic diagram of a second realisation of a modulator suitable for use in a time-scaling arrangement according to the invention:

FIG. 7 is a diagram of a dispersion means suitable for use in a time-scaling arrangement according to the invention, and FIG. 8 shows how the dispersion means employed in an embodiment of the invention may be implemented in practice.

The inventors have realised that the major problem with the usual time-scaling system as employed in the ADC arrangement described above lies in the nature of the modulator used. The problem will now be explained with reference to FIGS. 2 and 3.

Figure 2:
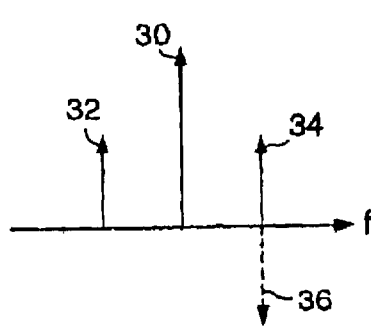
FIGS. 2 and 3 illustrate an undesirable effect of the modulator conventionally used in the known time-scaling arrangement.
Figure 3:
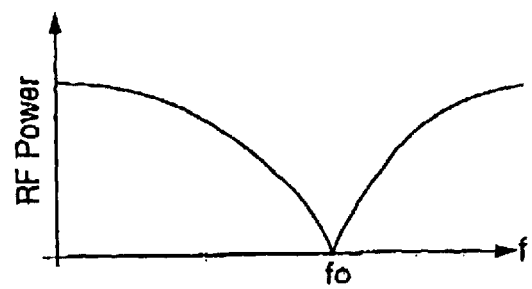

When a sinusoidal RF signal is applied at the electrical input, the conventionally used modulator produces at its output the typical signal composition associated with double-sideband (DSB) modulators, namely a high-amplitude carrier 30 and a pair of sidebands 32, 34 equidistantly spaced from the carrier (see FIG. 2). The system relies on the presence of dispersion after the modulator 12, and it is this dispersion which causes a differential rotation of the two sidebands relative to each other as a function of frequency, so that ultimately a frequency is reached at which the two sidebands are equal and opposite (see the sideband vector 36 in FIG. 2), in which case there is no RF signal detected after optoelectronic conversion. This frequency is shown as $f_0$ in FIG. 3. The upshot of this is that there is a maximum frequency component in the modulating signal 14 which is capable of being transmitted without undue attenuation due to this signal-fading effect. This in turn has meant that, in order to accommodate very high frequencies, the amount of dispersion in the dispersion means 16 has had to be very limited, which adversely affects the degree of time-stretching that can be achieved by the system.

Figure 4B:
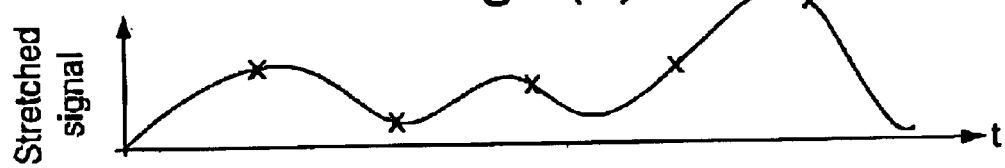
Figure 4C:
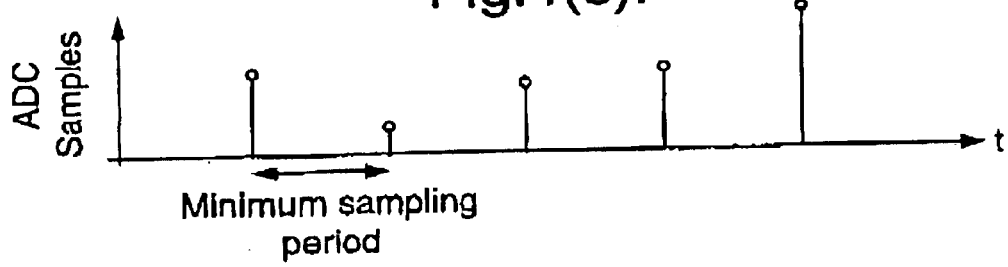

A reduction in the degree of time-stretching obtained in turn impacts the usefulness of the ADC 20 used at the output end of the system. This is more clearly explained with reference to FIG. 4, in which the time-stretched signal is shown in FIG. 4(b) against the original unstretched modulating signal 14 in FIG. 4(a). The ADC 20 has a maximum sampling rate as shown in FIG. 4(c) and it can be seen how the inadequate definition of the original signal by only 1 sample is replaced by the much better definition by 5 samples in the time-stretched case. (The number of samples given is exemplary only). Clearly, it is required that the modulating signal be stretched as much as possible so that an adequate definition can be derived of the highest-frequency components likely to be encountered.

Finally, in order to recover the high-frequency performance of the system in relation to the practical sampling performance of the ADC used, it has been necessary to increase the range of wavelength variation of the laser used as the source. As mentioned earlier, this has meant very complex laser designs with concomitant high costs.

The solution to this impasse proposed by the present inventors is to, employ instead of a DSB modulator a single-sideband (SSB) one. The effect of this measure is to drop one of the sidebands 32, 34 in FIG. 2, which means that, no matter how much dispersion is employed downstream of the modulator, phase-cancellation will not take place and therefore the wide-wavelength-range/low-dispersion tradeoff which is a feature of the known system can be replaced by a narrow wavelength range and a high dispersion. This in turn enables the laser system and associated control electronics to be greatly simplified, with resultant decrease in costs.

One realisation of an SSB modulator suitable for use in the present arrangement is shown in FIG. 5. In FIG. 5 the basic modulator is a conventional DSB Mach-Zehnder modulator 40 receiving on one input 42 the laser output radiation Em(t) and on another input 44 the modulating signal v(t). The output of the modulator 40 is taken to a phase modulator 46 which receives on a modulating input 48 a Hilbert transform of the modulating signal v(t), namely H[v(t)]. The output of the phase modulator 46 feeds the dispersion means 16. The transform leaves the amplitudes of the spectral components of v(t) unchanged, but shifts their phases by $\pi/2$.

In an alternative realisation of the SSB modulator involving the Hilbert transform principle, a Mach-Zehnder modulator has its driving characteristics modified in order to suppress one of the sidebands. This is illustrated in FIG. 6, in which the electrodes 50, 52 associated with respective limbs 54, 56 of the "Y" waveguide arrangement 58, have respective voltages v(t) and H[v(t)] applied to them.

The dispersion means 16 is preferably constituted by a suitably designed optical-fibre lightguide having a core possessing inherent dispersive properties. Such are readily available and include, in fact, many fibres used in other applications which would prefer a dispersion-free medium and often have to take corrective measures to compensate for the undesired dispersion that occurs in the fibre actually used. Alternatively a device such as a fibre Bragg-grating may be employed. One form of this is shown in FIG. 7 and comprises an optical fibre 60 having a cladding element 62 surrounding an inner core 64 composed of a material which is light-transmissive but which has along its length regions 66 of periodically varying refractive index. Such regions will generally have a sequentially increasing or decreasing period of refractive index variation.

The effect of such regions upon the incoming light is that the different wavelength components of that light are transmitted by some of the regions and reflected by others so that, as a result of the different path lengths involved, the different wavelength components arrive at different times back at the input of the fibre, where they are collected and passed on for further processing. A practical mechanism for achieving this is to use a circulator (see FIG. 8) which allows the incoming light to enter the fibre 60 and the reflected light to leave the fibre 60 and exit along an output guide 68.

Production of the regions 66 may be effected by the application of, e.g., external ultraviolet light to the fibre.

Figure 1:
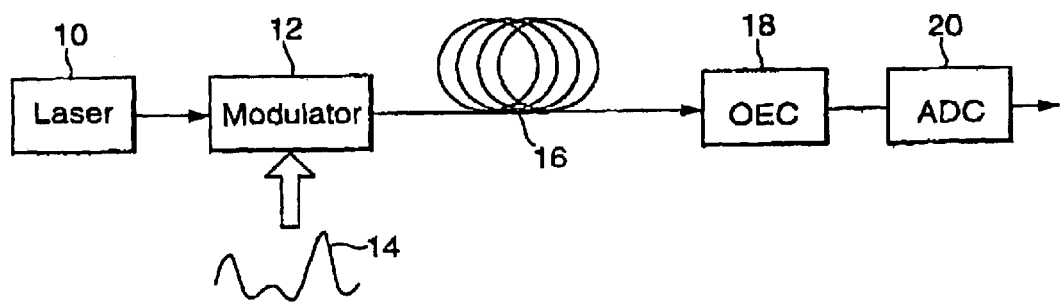
FIG. 1 is a schematic diagram of an ADC arrangement incorporating a known time-scaling arrangement.

The application of the generic time-stretching arrangement to an ADC has already been covered in connection with the FIG. 1 arrangement, and the present system may likewise be deployed in such an ADC context. It is, however, also possible to use the present inventive time-stretching system in other applications.

One such application is an RF frequency shifter, a prominent use of which would be as a Doppler generator. To make the inventive arrangement suitable for use in a Doppler system (e.g. for false target generation), it is necessary simply to apply to the modulator as the modulating signal a source of sinewaves, preferably a continuous source (CW signal). Then, because whatever appears on the modulating input of the modulator undergoes time-scaling, that signal will appear at the output of the OEC 18 as a sinewave of a different frequency. The difference between the two frequencies can be varied by altering either the wavelength-variation range of the laser 10 or the amount of dispersion in the dispersion means 16. The use of an SSB modulator in accordance with the present invention enables higher frequencies to be catered for than would be the case in the DSB arrangement by virtue of the lack of dispersion-related signal fading (see FIG. 3).

It should be noted that the above-described frequency-shifting function applies not only to single-frequency sinewaves, but to any signal having a plurality of frequency components. These components will be changed in frequency simultaneously by this process.

It is worth noting that, in this Doppler application, the time-scaling can be arranged to be either a time-stretching or a time-compression operation. To achieve stretching, the wavelength of the laser can be varied in the direction of, for example, increased frequency, while the fibre is of the type which gives increasing delay with increasing frequency (i.e. $\lambda_4<\lambda_1$ in the FIG. 7 example). For the time-compression case the laser wavelength may be lengthened over time (i.e. decrease in frequency), with the fibre again providing increased delay with increased frequency. Alternatively, for stretching the wavelength could be varied in the direction of decreasing frequency, provided the dispersion was such as to increase delay in the lower frequencies relative to the higher frequencies, and likewise for compression the wavelength could be varied in the direction of increasing frequency, provided this same dispersion characteristic held.

Time-compression produces sinewaves of increased frequencies and time-stretching produces sinewaves of decreased frequencies relative to the modulating input 14.

The invention envisages the use of a simple laser system and associated control arrangement which provides a CW (continuous-wave) laser output continuously wavelength-varied, preferably in a linear, or substantially linear fashion, between relatively narrow wavelength limits. Other wavelength-modulating characteristics (e.g. logarithmic) may, however, be used if desired. It is necessary only that the characteristics be fully known so that the temporal behaviour of the output of the time-scaling arrangement can be properly interpreted. A non-linear wavelength variation will normally result in distortion of the signal envelope at the output of the dispersion means, which in some applications can be desirable.

What is claimed is:

1. Signal time-scaling arrangement comprising: an optical source for delivering radiation at a wavelength which is variable with time over a given wavelength range; a single-sideband modulating means having a first input coupled to the optical source, a second input coupled to a modulating source, and an output; and a signal-dispersion means coupled to the output of the modulating means, the signal-dispersion means being operative to impose different delays on different wavelength components of the radiation, an output of the signal-dispersion means forming the output of the signal time-scaling arrangement.

2. Signal time-scaling arrangement as claimed in claim 1, wherein the optical source is a continuous-wave optical source.

3. Signal time-scaling arrangement as claimed in claim 2, wherein the variation of the radiation wavelength is a continuous variation over a given time period.

4. Signal time-scaling arrangement as claimed in claim 3, wherein the variation of the radiation wavelength is a substantially linear ramp.

5. Signal time-scaling arrangement as claimed in claim 1, wherein the modulating means is fed, in use, with the modulating signal and a Hilbert transformed version of the modulating signal.

6. Signal time-scaling arrangement as claimed in claim 5, wherein the modulating means comprises a double-sideband modulator having an input connected to the modulating source and an output connected to the signal-dispersion means through a phase modulator, a modulating input of the phase modulator receiving, in use, the Hilbert-transformed modulating signal.

7. Signal time-scaling arrangement as claimed in claim 5, wherein the modulating means is a Mach-Zehnder modulator, the electrodes associated with the two limbs of the modulator's "Y" waveguide arrangement being fed respectively, in use, by the modulating signal and the Hilbert-transformed version of the modulating signal.

8. Signal time-scaling arrangement as claimed in claim 1, wherein the signal-dispersion means comprises an optical fibre having intrinsic dispersion properties.

9. Signal time-scaling arrangement as claimed in claim 1, wherein the signal-dispersion means comprises a fibre Bragg-grating device.

10. Signal time-scaling arrangement as claimed in claim 1, wherein the optical source is a laser.

11. Signal time-scaling arrangement as claimed in claim 1, coupled wherein the output of the signal-dispersion means is coupled to an opto-electrical converter for converting the optical signal at the output of the signal-dispersion means into an electrical signal, and an output of the opto-electrical converter is coupled to an electrical analogue-to-digital conversion means.

12. Signal time-scaling arrangement as claimed in claim 1, wherein the opto-electrical convertor is a photodiode.

13. Signal time-scaling arrangement comprising a signal time-scaling arrangement as claimed claim 1, in any one of the preceding claims, wherein spectral components of the modulating signal appear shifted in frequency at the output of the dispersion means.

14. Signal time-scaling arrangement as claimed in claim 1, wherein the frequency shifter arrangement is a Doppler generator arrangement in which the modulating source is a source of continuous sinewaves.

15. Signal time-scaling arrangement as claimed in claim 1, wherein the sinewaves are of a predetermined frequency or are within a predetermined range of frequencies.

16. Method for time-scaling a signal, comprising: providing a source of optical radiation of a wavelength which is varied with time over a given wavelength range; intensity-modulating said radiation with an analogue signal which is to be time-scaled, the intensity-modulation taking place in a single-sideband modulator, and subjecting the modulated radiation to a dispersion process whereby different wavelength components of the radiation are delayed by different amounts, the thereby dispersion-processed modulated radiation constituting the time-scaled signal.

17. Method for time-scaling a signal as claimed in claim 16, wherein the radiation is continuous-wave radiation whose wavelength is varied in a continuous manner.

18. Method for time-scaling a signal as claimed in claim 17, wherein the wavelength is varied in a substantially linear manner.

19. Method for time-scaling a signal as claimed in claim 18, wherein the signal is time-stretched by arranging for the wavelength to be varied in a direction of increasing frequency and for the dispersion means to subject the higher-frequency components of the radiation to a longer delay than the lower-frequency components thereof.

20. Method for time-scaling a signal as claimed in claim 18, wherein the signal is time-stretched by arranging for the wavelength to be varied in a direction of decreasing frequency and for the dispersion means to subject the lower-frequency components of the radiation to a longer delay than the higher-frequency components thereof.

21. Method for time-scaling a signal as claimed in claim 18, wherein the signal is time-compressed by arranging for the wavelength to be varied in a direction of decreasing frequency and for the dispersion means to subject the higher-frequency components of the radiation to a longer delay than the lower-frequency components thereof.

22. Method for time-scaling a signal as claimed in claim 18, wherein the signal is time-compressed by arranging for the wavelength to be varied in a direction of increasing frequency and for the dispersion means to subject the lower-frequency components of the radiation to a longer delay than the higher frequency components thereof.

* * * * *